US012659691B2

(12) United States Patent
Kobayashi et al.

(10) Patent No.: US 12,659,691 B2
(45) Date of Patent: Jun. 16, 2026

(54) INFORMATION PROCESSING DEVICE FOR RESTRICTING OPERATION OF APPLICATION BY OPERATOR

(71) Applicant: TOYOTA JIDOSHA KABUSHIKI KAISHA, Toyota (JP)

(72) Inventors: Hideki Kobayashi, Miyoshi (JP); Yasuhiro Miura, Owariasahi (JP); Kuka Ishiyama, Musashino (JP); Koji Aikawa, Nagoya (JP); Tadahiro Nishikawa, Nisshin (JP); Yuji Ota, Kariya (JP); Motoki Maekawa, Nagakute (JP); Yasuhiro Ishiguro, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 344 days.

(21) Appl. No.: 18/480,065

(22) Filed: Oct. 3, 2023

(65) Prior Publication Data

US 2024/0239192 A1     Jul. 18, 2024

(30) Foreign Application Priority Data

Jan. 13, 2023     (JP) ................................. 2023-003749

(51) Int. Cl.
*H04W 4/02*         (2018.01)
*B60W 50/14*        (2020.01)
         (Continued)

(52) U.S. Cl.
CPC ............ *H04W 4/025* (2013.01); *B60W 50/14* (2013.01); *B60W 60/001* (2020.02); *G06V 10/70* (2022.01); *G06V 20/593* (2022.01);

*B60K 35/29* (2024.01); *B60K 35/80* (2024.01); *B60K 2360/195* (2024.01); *B60K 2360/33* (2024.01);
         (Continued)

(58) Field of Classification Search
CPC ........ B60K 35/00; B60K 35/29; B60K 35/80; B60K 2360/195; B60K 2360/33; B60K 2360/569; B60W 50/14; B60W 60/001; B60W 2050/146; B60W 2050/0064;
         (Continued)

(56) References Cited

U.S. PATENT DOCUMENTS 11,393,238 B1 *   7/2022   Kentley-Klay ........ B60K 35/22
11,801,858 B1 *  10/2023   Kuehnle .............. B60W 50/14
         (Continued)

FOREIGN PATENT DOCUMENTS

JP       2016-509763 A       3/2016
JP       2019-182013 A      10/2019
         (Continued)

*Primary Examiner* — Andrew R Dyer
(74) *Attorney, Agent, or Firm* — SoraIP, Inc.

(57)         ABSTRACT

The mobile device is provided with an operation restriction unit, and the operation restriction unit determines which seat of the vehicle is being operated from the captured image of the back camera. When determining that the captured image is captured by the driver's seat, the operation restriction unit restricts the operation of the process execution unit. Accordingly, in the mobile device, it is possible to prevent the mobile device from being operated in the driver's seat, which is appropriately restricted from being operated in the driver's seat in a vehicle or the like.

12 Claims, 6 Drawing Sheets

(51) Int. Cl.

| | | |
|---|---|---|
| *B60W 60/00* | (2020.01) | |
| *G06V 10/70* | (2022.01) | |
| *G06V 20/59* | (2022.01) | |
| *B60K 35/29* | (2024.01) | |
| *B60K 35/80* | (2024.01) | |

(52) U.S. Cl.
CPC .. *B60K 2360/569* (2024.01); *B60W 2050/146* (2013.01); *B60W 2540/227* (2020.02)

(58) Field of Classification Search
CPC ...... B60W 2540/227; B60W 2420/403; G06V 10/70; G06V 20/593; H04W 4/025
USPC .......................................................... 701/36
See application file for complete search history.

(56) References Cited

U.S. PATENT DOCUMENTS

| | | | | |
|---|---|---|---|---|
| 2006/0209072 A1* | 9/2006 | Jairam | ..................... | G06F 18/24 |
| | | | | 345/440 |
| 2007/0185644 A1* | 8/2007 | Hirose | ............... | G01C 21/3626 |
| | | | | 701/532 |
| 2008/0133122 A1* | 6/2008 | Mashitani | .............. | G01C 21/36 |
| | | | | 345/204 |
| 2014/0256303 A1* | 9/2014 | Jones | ................ | H04M 1/72454 |
| | | | | 455/418 |
| 2017/0083777 A1* | 3/2017 | Arata | ................... | B60N 2/0028 |

| | | | | |
|---|---|---|---|---|
| 2018/0319407 A1* | 11/2018 | Lisseman | ............. | G06V 20/597 |
| 2019/0192055 A1* | 6/2019 | Mizobuchi | .............. | B60R 16/02 |
| 2019/0299895 A1* | 10/2019 | Herbert | ............. | B60R 21/01554 |
| 2019/0329791 A1* | 10/2019 | Oba | ...................... | B60W 50/12 |
| 2020/0059550 A1 | 2/2020 | Nomura et al. | | |
| 2020/0098128 A1* | 3/2020 | Fujii | ......................... | G06T 7/60 |
| 2021/0053440 A1* | 2/2021 | Okuma | ................... | G06F 3/017 |
| 2021/0188289 A1* | 6/2021 | Oba | ......................... | G08G 1/16 |
| 2021/0188324 A1* | 6/2021 | Kim | ................. | B60W 60/0059 |
| 2021/0286357 A1* | 9/2021 | Oba | .................... | B60W 50/082 |
| 2022/0219717 A1* | 7/2022 | Lv | ......................... | B60W 30/10 |
| 2022/0289250 A1* | 9/2022 | Oba | ......................... | G08G 1/16 |
| 2023/0001948 A1* | 1/2023 | Hayashi | ................ | B60K 35/22 |
| 2023/0018303 A1* | 1/2023 | Itou | ........................ | B60K 35/60 |
| 2023/0030288 A1* | 2/2023 | Matsumoto | ....... | B60W 60/0051 |
| 2023/0100504 A1* | 3/2023 | Kuzu | ..................... | B60K 35/22 |
| | | | | 345/7 |
| 2023/0252117 A1* | 8/2023 | Guo | ....................... | G06V 40/50 |
| | | | | 713/186 |
| 2024/0034362 A1* | 2/2024 | Oba | .................. | B60W 60/0051 |
| 2024/0369867 A1* | 11/2024 | Moll | .................... | G02F 1/1323 |

FOREIGN PATENT DOCUMENTS

| | | | |
|---|---|---|---|
| JP | 2022-044602 A | 3/2022 | |
| JP | 2022-051084 A | 3/2022 | |
| WO | 2014/074544 A1 | 5/2014 | |
| WO | 2017/154208 A1 | 9/2017 | |
| WO | 2018/220852 A1 | 12/2018 | |

* cited by examiner

FIG. 5A
FIG. 5B
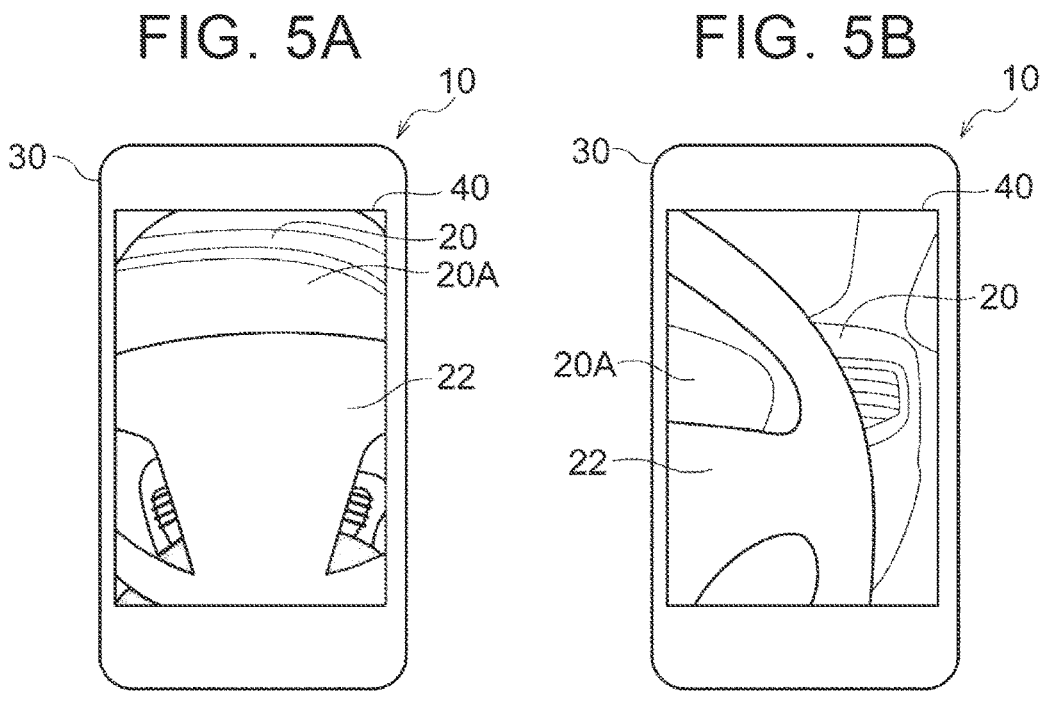
FIG. 5C
FIG. 5D
FIG. 5E
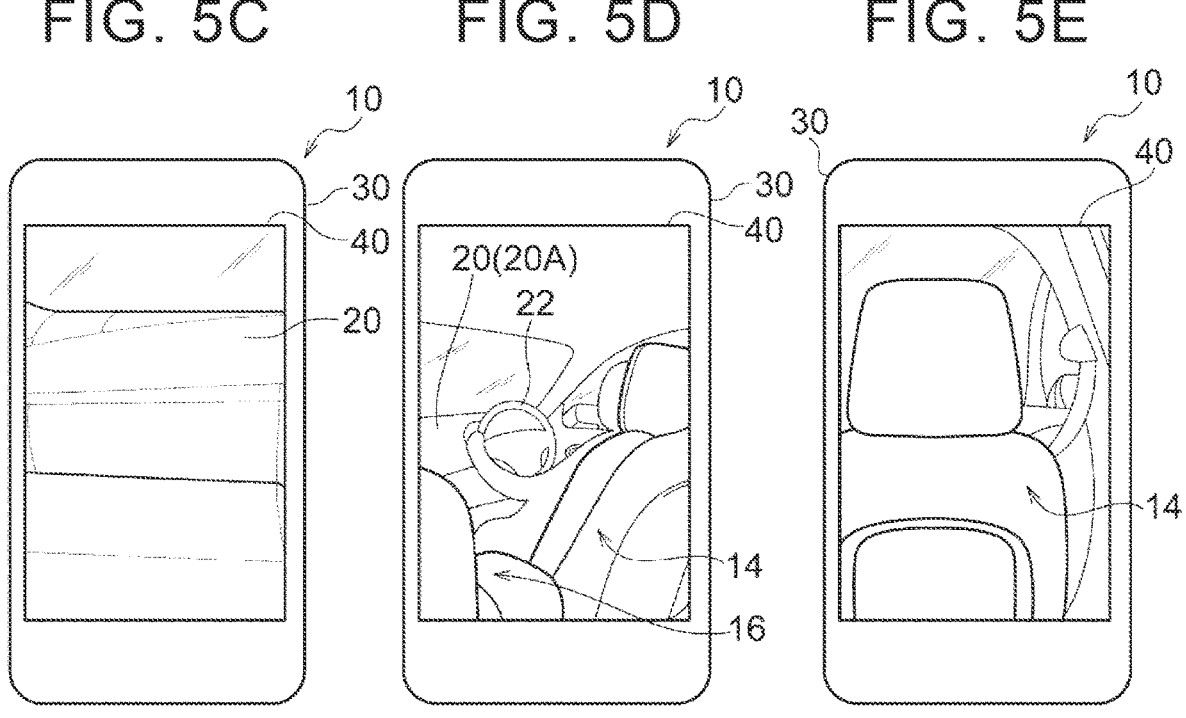

INFORMATION PROCESSING DEVICE FOR RESTRICTING OPERATION OF APPLICATION BY OPERATOR

CROSS-REFERENCE TO RELATED APPLICATION

This application claims priority to Japanese Patent Application No. 2023-003749 filed on Jan. 13, 2023, incorporated herein by reference in its entirety.

BACKGROUND

1. Technical Field

The present disclosure relates to an information processing device.

2. Description of Related Art

Japanese Unexamined Patent Application Publication No. 2022-044602 (JP 2022-044602 A) discloses a system for preventing a terminal operation during driving. In a communication terminal control system serving as the system for preventing a terminal operation, account information including identification information and a password is assigned in association with a communication terminal of a user. A control unit of a vehicle receives information for identifying the communication terminal of the driving user of the vehicle, and transmits a control signal to the communication terminal of the driving user so as not to reflect an operation input when the vehicle is in a non-autonomous driving state.

SUMMARY

If the information for identifying the communication terminal of the driving user is not received properly, however, the communication terminal of the driving user cannot be identified accurately. There is room for improvement in operation restriction for the communication terminal by an occupant sitting on a driver's seat.

The present disclosure has been made in view of the above circumstances, and an object of the present disclosure is to provide an information processing device that appropriately restricts a driver's operation in a vehicle or the like.

In order to achieve the above object, an information processing device according to a first aspect of the present disclosure includes: a process execution unit provided in a housing, to be operated by receiving an operation of an operator on an operation unit, and configured to execute a process in response to the received operation and display an image associated with the executed process on a display medium; an imaging unit disposed in the housing and configured to image a periphery of the housing; and an operation restriction unit configured to restrict an operation of the process execution unit when determination is made that the operator sits on a driver's seat of a vehicle based on an image captured by the imaging unit.

In the information processing device according to the first aspect, the process execution unit is operated by receiving the operation of the operator on the operation unit, executes the process in response to the received operation, and displays the image associated with the executed process on the display medium. The imaging unit is disposed in the housing together with the operation unit and the display medium, and images the periphery of the housing. The operation restriction unit restricts the operation of the process execution unit when determination is made that the operator sits on the driver's seat of the vehicle based on the image captured by the imaging unit.

By capturing the image viewed from the driver's seat, determination can properly be made as to whether the operator is performing the operation while sitting on the driver's seat based on the captured image. Thus, the operation caused by the operator performing the operation while sitting on the driver's seat is restricted properly.

In the information processing device according to the first aspect, one surface of the housing may be an operation surface of the operation unit and a display surface of the display medium, and the imaging unit may be configured to capture the image in a direction opposite to a direction of the one surface of the housing.

In the information processing device according to the first aspect, the operation restriction unit may be configured to restrict the operation of the process execution unit by restricting display on the display medium.

In the information processing device according to the first aspect, the operation restriction unit may be configured to restrict the operation of the process execution unit by stopping reception of the operation on the operation unit.

In the information processing device according to the first aspect, the display medium may be configured to display the image by transmitting light of a backlight based on the image to be displayed, and the operation restriction unit may be configured to restrict the operation of the process execution unit by turning OFF the backlight of the display medium.

The information processing device according to the first aspect may further include a movement acquisition unit configured to acquire a movement amount per unit time. The operation restriction unit may be configured to set the process execution unit to an unrestricted state when the movement amount per unit time acquired by the movement acquisition unit is smaller than a preset threshold value.

In the information processing device according to the first aspect, the vehicle may be configured to perform autonomous driving in which the vehicle is controlled to travel without a driving operation of an occupant, and the operation restriction unit may be configured to acquire, from the vehicle, information on whether the vehicle is performing the autonomous driving, and set the operation of the process execution unit to an unrestricted state when the vehicle is performing the autonomous driving.

In the information processing device according to the first aspect, the operation restriction unit may be configured to determine a seat where the operator sits by machine learning on the captured image.

The present disclosure may include the following aspects. A second aspect relates to an operation restriction method for an information processing device including a process execution unit provided in a housing, to be operated by receiving an operation of an operator on an operation unit, and configured to execute a process in response to the received operation and display an image associated with the executed process on a display medium. The operation restriction method includes: imaging a periphery of the housing by imaging means disposed in the housing; and restricting an operation of the process execution unit when determination is made that the operator sits on a driver's seat of a vehicle based on a captured image.

A third aspect relates to a program causing a computer provided in an information processing device to function as: a process execution unit to be operated by receiving an operation of an operator on an operation unit, and configured to execute a process in response to the received operation and display an image associated with the executed process on a display medium; an imaging unit configured to image a periphery of the housing by imaging means provided in the housing together with the operation unit and the display medium; and an operation restriction unit configured to restrict an operation of the process execution unit when determination is made that the operator sits on a driver's seat of a vehicle based on a captured image.

According to the present disclosure described above, the information processing device restricts the operation of the process execution unit when determination is made that the operator is performing the operation while sitting on the driver's seat, thereby providing an effect that the operation performed while sitting on the driver's seat can be restricted properly.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a schematic diagram illustrating an example of a vehicle-seat-by-seat photograph;

FIG. 5B is a schematic diagram showing an alternative view of photographed images for each seat of a vehicle;

FIG. 5C is a schematic diagram showing an alternative view of photographed images for each seat of a vehicle;

FIG. 5D is a schematic diagram showing an alternative view of photographed images for each seat of a vehicle;

FIG. 5E is a schematic diagram showing an alternative view of photographed images for each seat of a vehicle;

DETAILED DESCRIPTION OF EMBODIMENTS

First Embodiment

Hereinafter, an example of the embodiment of the present disclosure will be described in detail with reference to the drawings.

Figure 1:
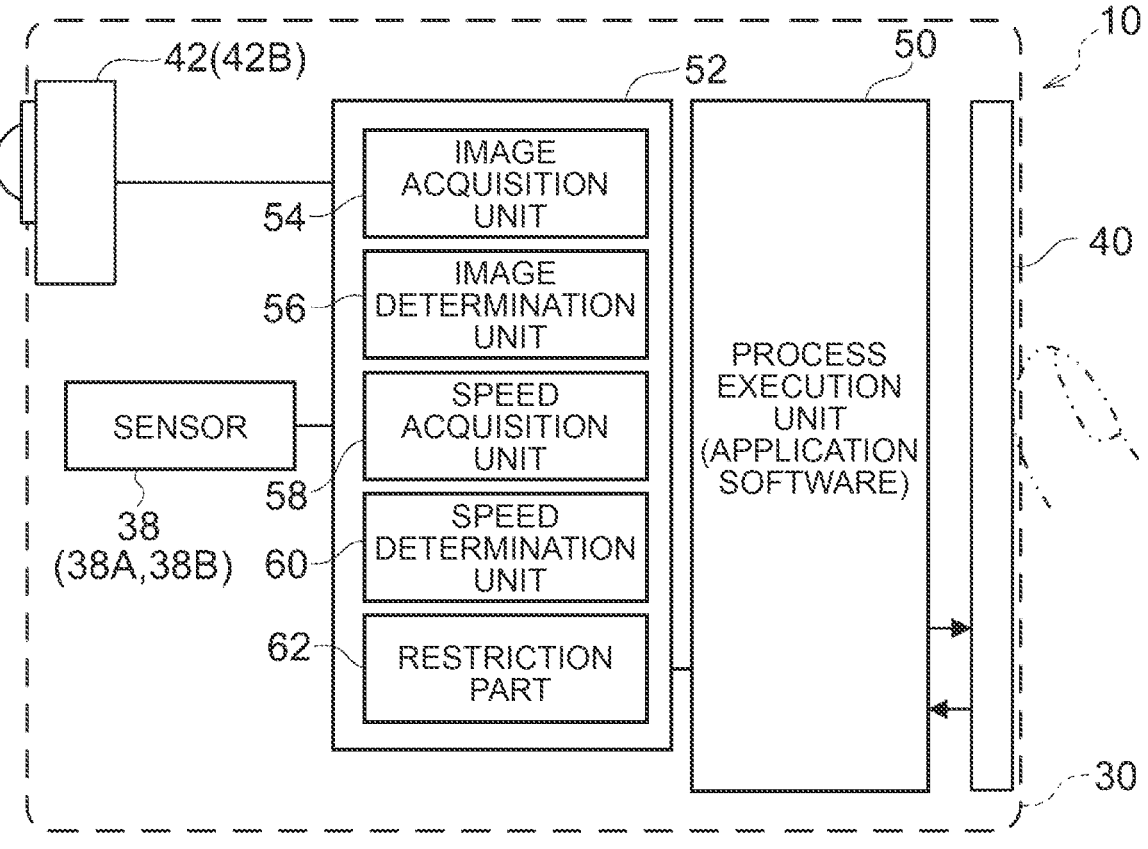
FIG. 1 is a schematic configuration diagram illustrating a mobile device according to a first embodiment.
Figure 2:
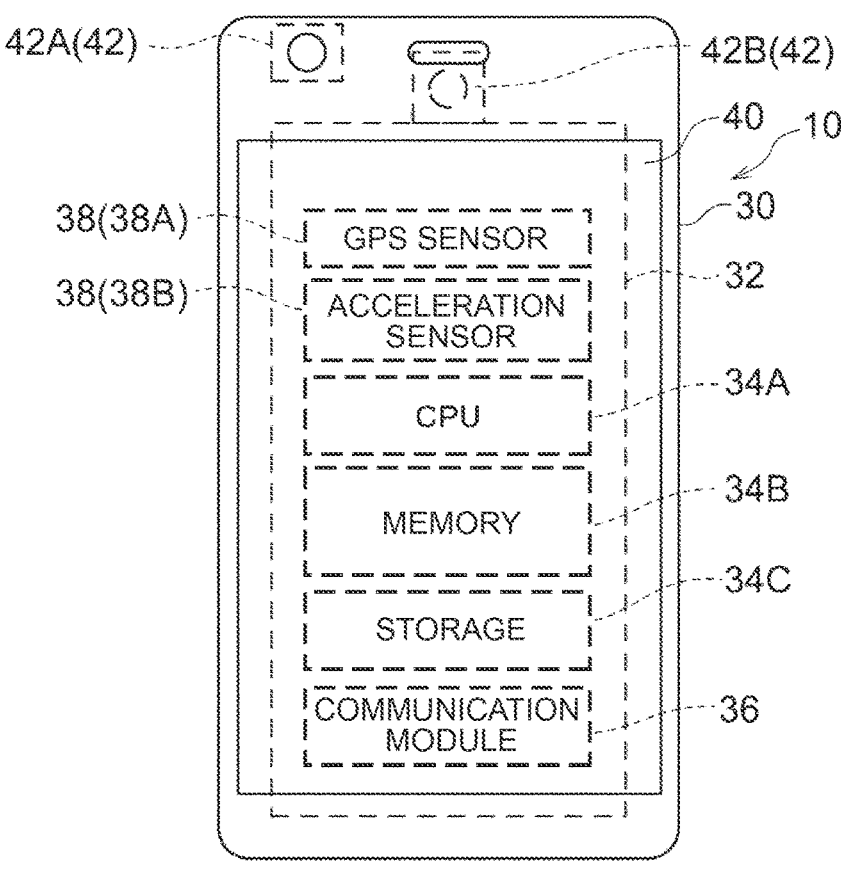
FIG. 2 is a schematic configuration diagram illustrating an external appearance of a mobile device.
Figure 3:
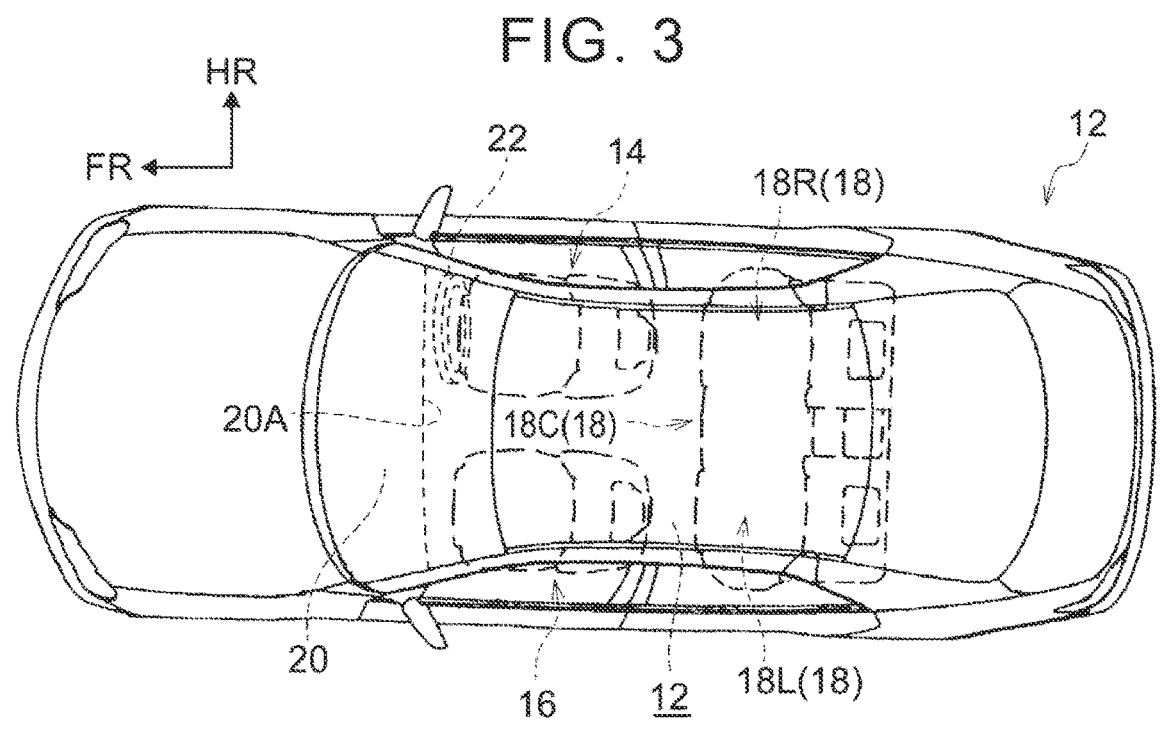
FIG. 3 is a plan view showing a schematic configuration of a vehicle.

FIG. 1 is a block diagram illustrating a schematic configuration of a mobile device 10 as an information processing device according to a first embodiment of the present disclosure, and FIG. 2 is a schematic diagram illustrating an external appearance of the mobile device 10. FIG. 3 is a plan view schematically illustrating the vehicle 12 according to the first embodiment. In the drawings, the front side of the vehicle 12 is indicated by an arrow FR, and the right side in the vehicle widthwise direction is indicated by an arrow HR.

As illustrated in FIG. 3, the vehicle 12 is an automobile such as a normal vehicle, and the vehicle 12 is driven by a driving force of a driving source. For the vehicle 12, a reciprocating engine vehicle equipped with an engine as a driving source, a hybrid electric vehicle (HEV) equipped with an engine and an electric motor, plug-in hybrid electric vehicle (PHEV), or a battery electric vehicle (BEV) equipped with an electric motor instead of an engine can be applied. In addition, the vehicle 12 may be a fuel cell electric vehicle (FCEV).

In the vehicle 12, a plurality of seats is arranged in a vehicle cabin 12A so that an occupant can ride on the vehicle. In the vehicle cabin 12A, a driver's seat 14 and a passenger's seat 16 are disposed on the vehicle front side, and the vehicle 12 is a so-called right steering wheel in which the driver's seat 14 is on the right side in the vehicle width direction and the passenger's seat 16 is on the left side in the vehicle width direction.

A rear seat 18 is disposed on the rear side of the vehicle in the vehicle cabin 12A. In the rear seat 18, the left side in the vehicle width direction is set to the left rear seat 18L, the right side in the vehicle width direction is set to the right rear seat 18R, and the space between the left rear seat 18L and the right rear seat 18R is set to the middle rear seat 18C, so-called three-person hook. The vehicle 12 is not limited to a five-person ride, and may be a four-person ride in which two persons sit on the rear seat 18. In addition, the vehicle 12 may be provided with a driver's seat 14 on which an occupant to be driven and operated is seated. The vehicle 12 may be a two-person or three-person ride such as a freight car or the like, or may be a so-called wagon vehicle, a bus, or the like in which a plurality of rear seats 18 are arranged in front and rear, and six or more persons can ride.

In the vehicle 12, a dashboard 20 is installed at a front portion of the vehicle cabin 12A. In the dashboard 20, a surface on the vehicle cabin 12A side (a surface on the vehicle rear side) is an instrument panel 20A. In addition, a steering (steering wheel) 22 as a steering unit is installed on the vehicle front side of the driver's seat 14 in the vehicle 12. The vehicle 12 is driven by an occupant (driver) seated on the driver's seat 14 by a driving operation including an operation of the steering wheel 22. Note that the vehicle 12 may be provided with an autonomous driving function in which traveling control is performed without the driver's operation performed by an occupant seated on the driver's seat 14.

On the other hand, a portable information processing device such as a smart phone or a Personal Digital Assistant (PDA) is applied to the mobile device 10. The mobile device 10 may be a notebook personal computer. As a result, the mobile device 10 can be operated in the vehicle cabin 12A by being carried by an occupant and riding on the vehicle 12.

As shown in FIG. 2, a motherboard 32 is disposed in a housing (casing) 30 having a rectangular thin box shape in the mobile device 10. A CPU 34A, a memory 34B, and a non-volatile storage (external storage) 34C are mounted on the motherboard 32 and electrically connected to each other. A ROM, RAM and a nonvolatile storage (internal storage) are used as the memory 34B, and a microSD card or the like is used as the storage 34C, for example.

In the mobile device 10, a microcomputer is configured on the motherboard 32 by a CPU 34A, a memory 34B, a storage 34C, and the like. The mobile device 10 is activated by CPU 34A reading and executing an OS stored in the memory 34B. Further, the mobile device 10 realizes various functions according to the application software by CPU 34A executing a program (application software) stored in the memory 34B or the storage 34C.

The mobile device 10 includes a communication module 36 as a wireless communication unit and a plurality of sensors 38 as detection units, and each of the communication module 36 and the plurality of sensors 38 is mounted on the motherboard 32. As the sensor 38, a GPS sensor 38A for detecting position data, an acceleration sensor (G sensor) 38B for detecting acceleration, or the like is used. Note that various sensors such as a magnetic sensor and a gyroscope can be applied to the sensor 38, and information detected by the sensor 38 is used in the application software in the mobile device 10.

Further, the mobile device 10 includes a display medium and a touch panel type display 40 as an operation unit, two camera modules 42 as an imaging unit, a microphone and a speaker (a microphone and a speaker are not shown). The display 40, the camera module 42, the microphone, and the speaker are electrically connected to the motherboard 32.

The display 40 is attached to one surface (hereinafter referred to as a surface) of the housing 30. A liquid crystal panel, a backlight, and a touch sensor are used for the display 40, and when the backlight is turned on, light emitted from the backlight is transmitted and an image is displayed in accordance with the display of the liquid crystal panel. Further, in the display 40, the touch position is detected by the touch sensor by touching the surface. As a result, the operator (occupant) of the mobile device 10 can visually recognize the display image of the display 40 and perform an operation (touch operation) corresponding to the display image by directing the surface (display 40) toward itself.

In addition, the camera module 42 constitutes a front camera 42A in which a lens is disposed on the front surface of the housing 30, and constitutes a back camera 42B in which a lens is disposed on the back surface of the housing 30. An operator (occupant) of the mobile device 10 can take an image of himself or herself by the front camera 42A and an image of himself or herself in front of himself or herself by the back camera 42B by directing the front surface toward himself or herself.

In the mobile device 10, the communication module 36 is connected to a telephone network (line network) or the like in a radio manner by applying a required communication standard such as a 4G standard or a 5G standard. In the mobile device 10, since the communication program is activated, telephone functions such as a voice call using a microphone and a speaker, a video call using a display 40, a camera module 42 (front camera 42A), a microphone and a speaker are realized.

Further, in the mobile device 10, the communication module 36 connects to various servers (not shown) via a network such as the Internet, so that various kinds of data can be acquired from the servers and various kinds of processing using the servers can be performed. Further, the communication module 36 can perform communication (short-range communication) by a radio system using Wi-Fi standard, Bluetooth (registered trademark) standard, Bluetooth Low Energy (BLE) (registered trademark) standard, and the like.

As illustrated in FIG. 1, in the mobile device 10, CPU 34A executes the application software to form a process execution unit 50 corresponding to the application software to be executed. The process execution unit 50 controls the display of the display 40 in accordance with the processing to be executed, receives the operation by performing various operations on the display 40, and executes the processing in accordance with the received operation.

The process execution unit 50 (application software) may execute a telephone function. Further, a general configuration in which the display image is changed in accordance with a touch operation on the display 40 while an image is displayed on the display 40 can be applied to the process execution unit 50. As the process execution unit 50, navigation software, game application software that progresses in accordance with a movement amount, a movement speed, or the like of the mobile device 10, content displayed on the display 40 may be changed in accordance with a movement amount, a movement speed, or the like of the mobile device 10, or content emitted from a speaker or the like may be changed.

When the navigation software is executed, the process execution unit 50 acquires information detected by GPS sensor 38A, and executes a process corresponding to the acquired information. Accordingly, the process execution unit 50 acquires the position information of the own device from the information detected by GPS sensor 38A, and reflects the position information of the own device on the map-image displayed on the display 40.

On the other hand, in the mobile device 10, the operation restriction program is stored in the memory 34B and the storage 34C, and the mobile device 10 executes the operation restriction program by executing the application software. As a result, the mobile device 10 is formed with the operation restriction unit 52 as the restricting device.

When it is determined that the occupant seated on the driver's seat 14 in the traveling vehicle 12 is operating the mobile device 10, the operation restriction unit 52 restricts the processing in the process execution unit 50 and restricts the mobile device 10 from being operated by the driver as the occupant seated on the driver's seat 14 of the vehicle 12.

The operation restriction unit 52 includes an image acquisition unit 54, an image determination unit 56, a speed acquisition unit 58, a speed determination unit 60, and a restriction unit 62. The image acquisition unit 54 captures images at predetermined intervals using the camera module 42 (back camera 42B). When the operator rides on the vehicle 12 from the captured image acquired by the image acquisition unit 54, the image determination unit 56 determines whether the seated seat is the driver's seat 14, the passenger's seat 16, or the rear seat 18 (the left rear seat 18L, the right rear seat 18R, or the middle rear seat 18C).

The speed acquisition unit 58 acquires the moving speed of the mobile device 10 from the detection information detected by the sensor 38. For example, when the detected information (position information) by GPS sensor 38A is used, the speed acquisition unit 58 acquires the moving speed from the change of the position information and the time required for the change. When the detected information (acceleration information) by the acceleration sensor 38B is used, the moving velocity is acquired by using the temporal change of the acceleration and the acceleration.

The speed determination unit 60 determines whether or not the mobile device 10 is in a state of being considered to be stopping the movement from the movement speed acquired by the speed acquisition unit 58. At this time, a set speed (for example, whether or not it is less than a 10 km/h) is set in advance as a threshold value for the moving speed in the speed determination unit 60, and the speed determination unit 60 determines whether or not the moving speed is less than the set speed. When the operator sits on the driver's seat 14 of the vehicle 12 (is the driver) and the moving speed is determined to be equal to or higher than the set speed, the restriction unit 62 determines that the execution of the processing in the process execution unit 50 needs to be restricted, and limits the processing in the process execution unit 50.

As the restriction on the process execution unit 50, turning off the backlight on the display 40, stopping the reading of the detection signal of the touch sensor, and the like can be applied, and the restriction may be set in advance for each application software executed in the process execution unit 50. For example, when the navigation software is being executed, the operation acceptance for the display 40 may be stopped (interrupted). When game software or the like is executed, the backlight may be turned off or the like.

Next, the operation of the first embodiment will be described. The mobile device 10 is portable, so that the operator can move to an arbitrary place and operate at the moving place. As a result, the mobile device 10 can be carried by the operator to get into the vehicle 12, and can be operated in the vehicle cabin 12A.

Figure 4:
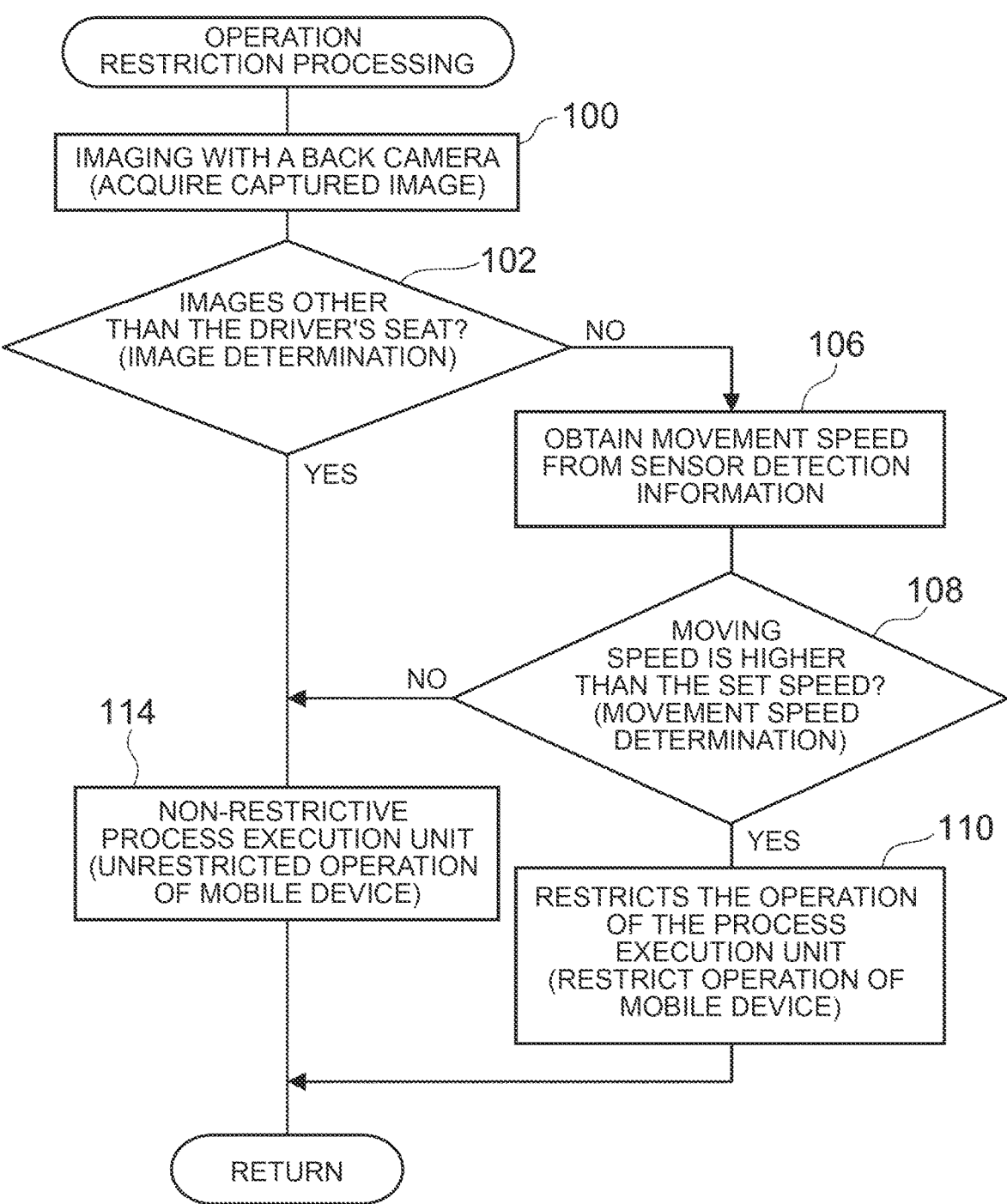
FIG. 4 is a flowchart illustrating an outline of an operation restriction process according to the first embodiment.

Here, the mobile device 10 is configured with an operation restriction unit 52. The operation restriction unit 52 does not restrict the operation of the mobile device 10 if the operator is seated other than the driver's seat 14 (if the operator is an occupant other than the driver), and makes it possible to restrict the operation of the mobile device 10 when the operator is determined to be seated on the driver's seat 14 (if the operator is a driver). FIG. 4 is a flowchart schematically illustrating an operation restriction process executed by the operation restriction unit 52. Further, in FIG. 5A to FIG. 5E, photographed images in the vehicle cabin 12A are shown in a schematic view.

The flowchart of FIG. 4 is repeatedly executed in the background and at predetermined time intervals during the operation of the process execution unit 50 by activating the application software set in advance in the mobile device 10 and operating the process execution unit 50.

In the operation restriction unit 52 of the mobile device 10, in the first step 100 of this flow chart, the image acquisition unit 54 uses the back-camera 42B to image the inside of the vehicle cabin 12A. In the next step 102, the operation restriction unit 52 determines whether or not the image determination unit 56 is an image captured in a seat (the passenger's seat 16 or the rear seat 18) other than the driver's seat 14 from the captured image (image determination).

In the vehicle cabin 12A of the vehicle 12, the surrounding scenery is different for each seat, and the captured images captured by the back camera 42B are also different. In FIG. 5C, a captured image in the passenger's seat 16 is shown, in FIG. 5D, a captured image in the left rear seat 18L is shown, and in FIG. 5E, a captured image in the right rear seat 18R is shown. In each of FIG. 5A to FIG. 5E, it is assumed that captured images of the back camera 42B are displayed on the display 40.

As shown in FIG. 5C, when the operator is seated on the passenger's seat 16, the captured images often include a dashboard 20 on the front side of the passenger seat's 16, a windshield glass, a lower side of the dashboard, and the like.

In addition, when the operator is seated in the rear seat 18, the captured image often includes the driver's seat 14, the vehicle rear side of the passenger's seat 16 (the vehicle rear side of the seat back), the driver's seat 14, the dashboard 20 visible through the passenger's seat 16, and the like. Therefore, as shown in FIG. 5D, when the operator is seated in the left rear seat 18L, the captured images often include the rear surface of the seatback of the driver's seat 14, the rear surface of the seatback of the passenger's seat 16, and the center console. When the operator is seated in the left rear seat 18L, the captured image includes a center console, a dashboard 20, an instrument panel 20A, a steering wheel 22, a driver, and the like from between the driver's seat 14 and the passenger's seat 16.

Further, as shown in FIG. 5E, when the operator is seated in the right rear seat 18R, the captured images often include the rear surface of the seatback of the driver's seat 14, the rear surface of the seatback of the passenger's seat 16, and the center console. When the operator is seated in the right rear seat 18R, the captured image includes a center console from between the driver's seat 14 and the passenger's seat 16, a dashboard 20 on the front side of the passenger's seat 16, an instrument panel 20A on the front side of the passenger's seat 16, and the like.

On the other hand, when the operator is seated on the driver's seat 14, the captured image includes a scenery of the front side of the vehicle viewed from the driver's seat 14. Therefore, as shown in FIG. 5A and FIG. 5B, when the operator is seated on the driver's seat 14, the captured images include an instrument panel 20A including a steering wheel 22, a dashboard 20, a meter panel, and the like, a lower side of the steering wheel 22 (at the foot of the operator), a windshield glass, and the like.

As described above, the captured images of the back camera 42B of the mobile device 10 include components and the like in the vehicle cabin 12A that differ for each seat. In addition, the captured images having different seats have different positions, orientations, and the like on the images of components and the like in the vehicle cabin 12A. From this, it can be easily determined from the captured images of the back camera 42B of the mobile device 10 which seats in the vehicle cabin 12A are captured.

In addition, Artificial Intelligence (AI) techniques can be used to determine seats in which the operator of the mobile device 10 is seated from the captured images. For example, a plurality of captured images taken around each seat are used for each seat, and machine learning is performed using the respective components in the vehicle cabin 12A shown in the captured image, the positions of the respective components on the captured image, the directions of the respective components on the captured image, and the like as feature quantities to create a learned model. By using this learned model, it is possible to easily and accurately determine the seat on which the operator of the mobile device 10 is seated from the captured image.

Such a learned model is preferably provided in a server (external server) connected to the mobile device 10 via a network, so that it can be made available between the plurality of mobile devices 10 and the processing load of the individual mobile devices 10 can be reduced.

In FIG. 4, when it is determined that the image is an image captured in a seat other than the driver's seat 14, the operation restriction unit 52 makes an affirmative determination in step 102 and proceeds to step 104. In step 104, in the operation restriction unit 52, the restriction unit 62 sets the process execution unit 50 to the unrestricted state. As a result, in the mobile device 10, the operation of the process execution unit 50 is continued, and the operator can enjoy application software such as a game.

If it is determined that the image is captured by the driver's seat 14, the operation restriction unit 52 makes a negative determination in step 102 and proceeds to step 106. In step 106, the operation restriction unit 52 acquires the detection information of the sensor 38 by the speed acquisition unit 58, and acquires the moving speed of the mobile device 10 based on the acquired detection information.

In the next step 108, the operation restriction unit 52 determines whether or not the speed determination unit 60 is equal to or higher than the set speed with respect to the moving speed (moving speed determination). The moving speed of the mobile device 10 carried by the occupant is the same as the traveling speed of the vehicle 12. Further, the set speed is a speed at which the vehicle 12 can be considered to be stopped, and the speed at which the vehicle 12 can be considered to be stopped includes a speed immediately before the stop of the vehicle 12. From here, for example, a speed equal to or less than a 10 km/h such as 10 km/h (speed 10 km per hour) can be applied to the set speed.

If the moving speed is less than the set speed (0≤moving speed<set speed), the operation restriction unit 52, the speed determination unit 60 makes a negative determination in step 108, the process proceeds to step 104. As a result, in the operation restriction unit 52, the restriction unit 62 sets the process execution unit 50 to the unrestricted state.

On the other hand, when the moving speed is equal to or higher than the set speed (moving speed≥set speed), the speed determination unit 60 makes an affirmative determination in step 108 and proceeds to step 110. In step 110, the operation restriction unit 52 restricts the operation of the process execution unit 50 by the restriction unit 62.

The restriction on the process execution unit 50 may be set in advance for each application software executed in the process execution unit 50. The limitation may be the turning off of the backlight on the display 40 or the stopping of the reading of the detection signal of the touch sensor on the display 40. In addition, the restriction may be a combination of the operation of the process execution unit 50 and a pause. As a result, the operation of the process execution unit 50 of the mobile device 10 is restricted, and it is possible to restrict the operation by the occupant seated on the driver's seat 14.

In this way, in the mobile device 10, when it is determined that the operator is seated on the driver's seat 14 of the vehicle 12 from the captured images of the back camera 42B, the operation restriction unit 52 capable of restricting the operation of the process execution unit 50 is provided, so that it is possible to appropriately restrict the operation by the operator seated on the driver's seat 14. In addition, the operation restriction unit 52 can be easily configured by including the image acquisition unit 54 and the image determination unit 56.

In addition, the mobile device 10 is provided with a back camera 42B that captures an image of a face of the housing 30 opposite to the face on which the display 40 is disposed, so that the back camera 42B can obtain captured images that can easily determine the seats on which the operator is seated. By applying AI technique to the determination of seats using captured images, it is possible to perform determination with higher accuracy.

Further, the operation restriction unit 52 may include a speed acquisition unit 58 and a speed determination unit 60. The operation restriction unit 52 acquires a moving speed as a moving amount per unit time using the detected information of GPS sensor 38A and the acceleration sensor 38B mounted on the mobile device 10, and when the acquired moving speed is less than a preset set speed, the process execution unit 50 is set to an unrestricted state. This can prevent unnecessary restrictions on the operation of the mobile device 10.

In the first embodiment, captured images of the back camera 42B are used to determine seats. However, a captured image captured by the front-camera 42A may be used for the determination of the seats. Further, in the first embodiment, the operation restriction processing is operated in the background, but the present disclosure is not limited thereto, and a captured image may be displayed at a corner of the display 40 to clearly indicate that the operation restriction processing is executed.

Second Embodiment

Next, a second embodiment will be described. The basic configuration of the second embodiment is the same as that of the first embodiment, and the same reference numerals as those of the first embodiment are given to the same functional components as those of the first embodiment in the second embodiment, and the description thereof is omitted.

Figure 6:
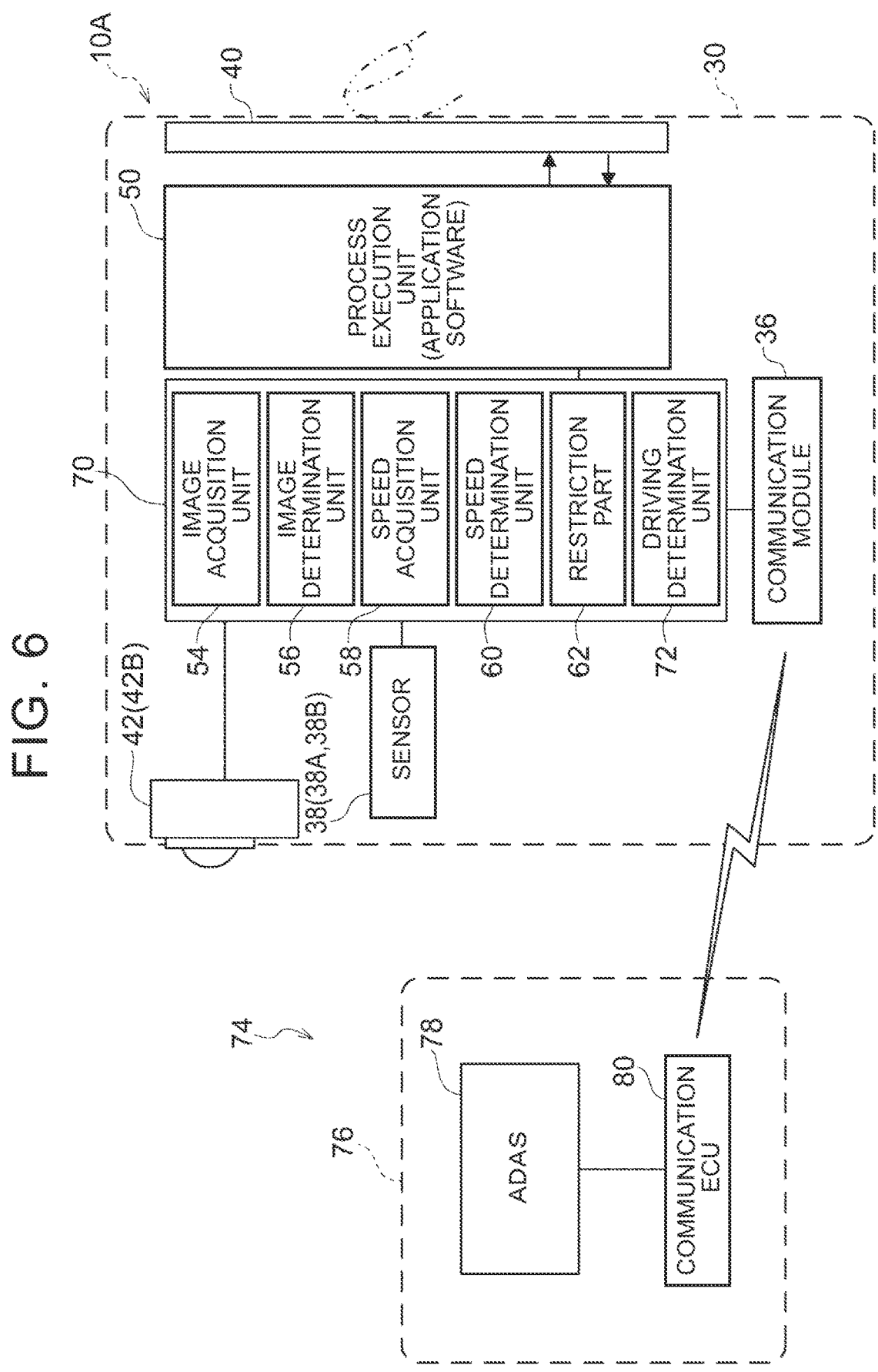
FIG. 6 is a schematic configuration diagram illustrating a mobile device according to a second embodiment.
Figure 7:
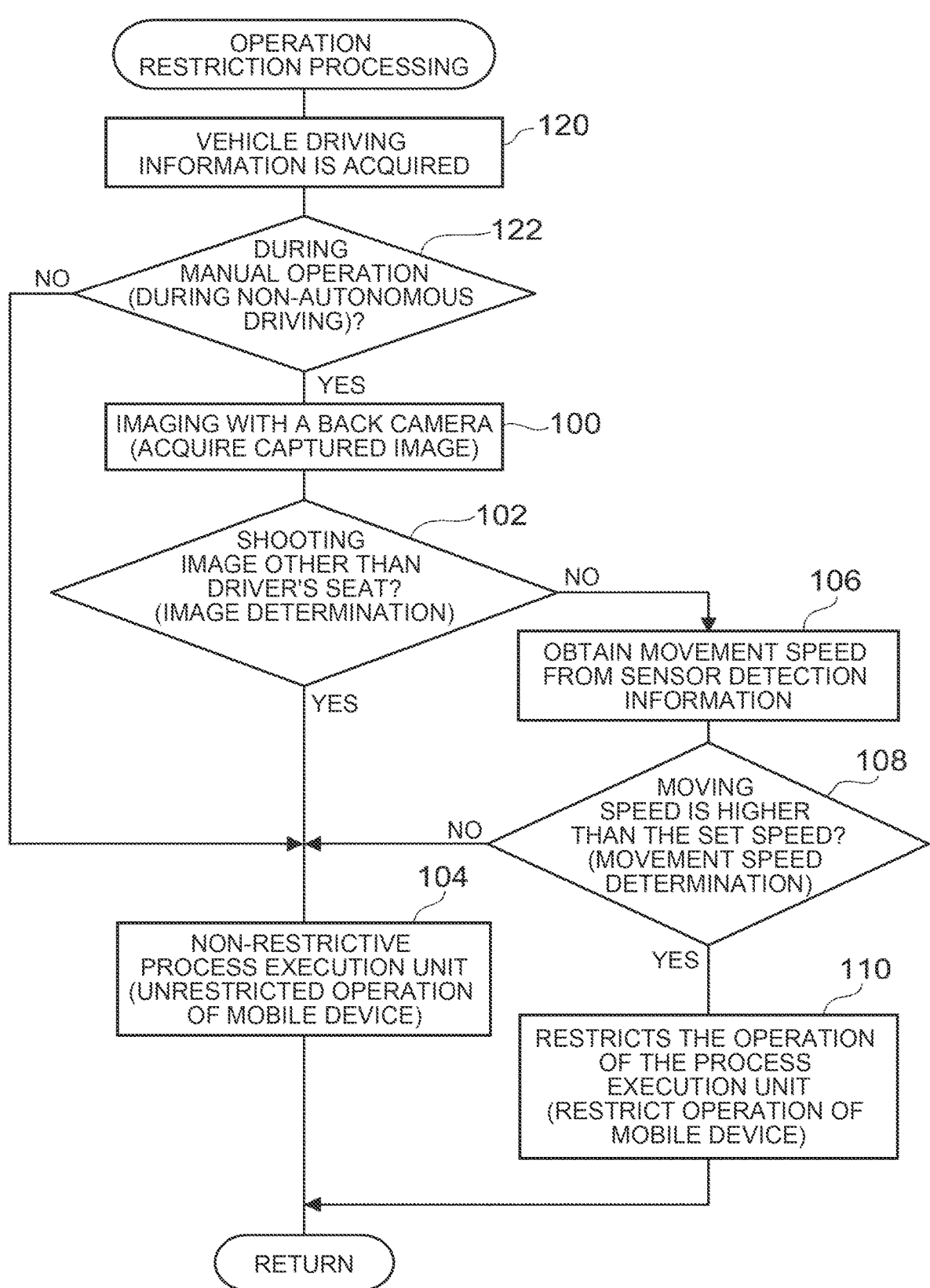
FIG. 7 is a flowchart illustrating an outline of an operation restriction process according to the second embodiment.

FIG. 6 is a block diagram illustrating a schematic configuration of a mobile device 10A as an information processing device according to a second embodiment, and FIG. 7 is a flow diagram illustrating an operation-limiting process in the mobile device 10A.

As shown in FIG. 6, the mobile device 10A is provided with an operation restriction unit 70 in place of the operation restriction unit 52, and the operation restriction unit 70 is different from the operation restriction unit 52 in that it includes an driving determination unit 72 as an acquisition unit. In the second embodiment, the vehicle 74 is used instead of the vehicle 12, and the vehicle 74 is different from the vehicle 12 in that it has an autonomous driving function.

A control system 76 for performing various types of control such as travel control is formed in the vehicle 74. The control system 76 includes a plurality of Electronics Control Unit (ECU), a plurality of vehicle state detection units for detecting a traveling state, a traveling environment, and the like of the vehicle 74, and an in-vehicle network for connecting each of the plurality of ECU and the plurality of vehicle state detection units (all of which are not shown). Various actuators (not shown) as control targets are electrically connected to ECU. The control system 76 controls the traveling of the vehicle 74 by operating various actuators in cooperation with a plurality of ECU according to information detected by the vehicle state-detecting unit.

In addition, the control system 76 includes an Advanced Driver Assistance Systems (ADAS) 78 that functions as an autonomous driving unit that controls the traveling of the vehicle 74 without the occupant's intervention. Thus, the control system 76 can control the travel of the vehicle 74 by autonomous driving at the level 3 or the level 4.

The control system 76 includes a communication ECU 80 as a communication unit. The communication ECU 80 can communicate with the communication module 36 of the mobile device 10A using Wi-Fi standard, Bluetooth (registered trademark) standard, Bluetooth Low Energy (BLE) (registered trademark) standard, or the like.

The operation restriction unit 70 of the mobile device 10A communicates with the communication ECU 80 of the vehicle 74 via the communication module 36, so that the driving determination unit 72 acquires the driving status of the vehicle 74. The driving state of the vehicle 74 acquired by the driving determination unit 72 includes whether the vehicle 74 is a manual driving operation by an occupant (driver) seated in the driver's seat 14, and whether or not the vehicle is in an autonomous driving at a level of 3 or higher when the vehicle is not a manual driving operation. In the following description, level 3 or higher is referred to as autonomous driving, and a driving level lower than level 3 is referred to as manual driving (non-autonomous driving).

The driving determination unit 72 determines whether or not the driving state of the vehicle 74 is the level 3 or more autonomous driving from the acquired driving state. When it is determined that the driving determination unit 72 is in the autonomous driving at the level 3 or higher, the restriction unit 62 sets the process execution unit 50 to the unrestricted state.

Next, the operation restriction processing in the second embodiment will be described with reference to FIG. 7. The flow chart of FIG. 7 is executed in the mobile device 10A in place of the flow chart of FIG. 4, and in the first step 120, the driving determination unit 72 acquires the driving status of the vehicle 74 from the control system 76 of the vehicle 74 in the operation restriction unit 70. In the next step 122, the operation restriction unit 70 determines whether or not the vehicle 74 is in manual driving (non-autonomous driving) from the driving state acquired from the control system 76 by the driving determination unit 72.

Here, when the vehicle 74 is traveling control in the level 3 or more autonomous driving, the operation restriction unit 70, the driving determination unit 72 makes a negative determination in step 122, the process proceeds to step 104. Accordingly, in the mobile device 10A, even if the operator is seated on the driver's seat 14, the operation of the process execution unit 50 is continued, and the operator can enjoy the application software such as the game.

On the other hand, when the vehicle 74 is in a driving state that is less than the level 3 including the manual driving (level 1), the driving determination unit 72 in the operation restriction unit 70 makes an affirmative determination in step 122. Thus, the operation restriction unit 70 performs the same processing as the operation restriction unit 52 (the operation restriction processing illustrated in FIG. 4). Therefore, the mobile device 10A can achieve the same advantages as those of the mobile device 10.

As described above, in the mobile device 10A, when the operator rides on the vehicle 74 having the level-3 or higher autonomous driving function, the user can enjoy application software such as a game when the vehicle 74 is in autonomous driving. In this way, the mobile device 10A does not unnecessarily restrict the manipulation in the vehicle 74.

What is claimed is:

1. An information processing device comprising:
a processor provided in a housing;
a display configured to receive an operation of application software by an operator; and
a camera disposed in the housing and configured to capture first images of an area surrounding the housing,
wherein the processor is configured to
execute a process of the application software in response to the received operation,
cause the display to display a second image associated with the executed process,
determine whether the operator sits on a driver's seat of a vehicle based on the first images based on a model trained using machine learning with features extracted from the first images, the features including respective components in a vehicle cabin of the vehicle, positions of the respective components, and directions of the respective components, and
restrict the process of the application software in a case where the processor determines that the operator sits on the driver's seat based on the first images;
a first sensor configured to detect a movement speed of the information processing device that moves,
wherein:
the display is further configured to display the second image as content of the application software; and
the process of the application software is executed by acquiring the movement speed of the information processing device from the first sensor and by changing the second image in accordance with the movement speed of the information processing device.

2. The information processing device according to claim 1, wherein:
the display is a touch panel attached to one surface of the housing, the touch panel including an operation surface and a display surface; and

the camera is configured to capture the first images in a direction opposite to a direction of the one surface of the housing.

3. The information processing device according to claim 1, wherein the process of the application software is restricted by restricting the display of the second image on the display.

4. The information processing device according to claim 1, wherein the process of the application software is restricted by stopping reception of the operation on the display.

5. The information processing device according to claim 4, wherein:
the display includes a second sensor configured to detect a touch operation by the operator on the display;
the processor is further configured to acquire a signal of the touch operation from the second sensor; and
the process of the application software is restricted by stopping reading the signal.

6. The information processing device according to claim 1, wherein:
the display is configured to display the second image by transmitting light of a backlight; and
the process of the application software is restricted by turning OFF the backlight of the display.

7. The information processing device according to claim 1, further comprising a first sensor configured to detect a movement speed of the information processing device that moves,
wherein the processor is further configured to
acquire the movement speed of the information processing device from the first sensor,
determine whether the movement speed of the information processing device is less than a preset threshold value, and
continue to execute the process of the application software in a case where the processor determines that the movement speed of the information processing device is less than the preset threshold value.

8. The information processing device according to claim 1, wherein:
the vehicle is configured to perform autonomous driving in which the vehicle is controlled to travel without a driving operation of an occupant; and
the processor is further configured to
determine whether the vehicle is performing the autonomous driving, and
continue to execute the process of the application software in a case where the processor determines that the vehicle is performing the autonomous driving.

9. The information processing device according to claim 1, wherein the information processing device is a smart phone.

10. The information processing device according to claim 1, wherein the second image is content of the application software.

11. The information processing device according to claim 4, wherein the processor is further configured to pause the execution of the process of the application software.

12. An information processing device comprising:
a processor provided in a housing;
a display configured to receive an operation of application software by an operator; and
a camera disposed in the housing and configured to capture first images of an area surrounding the housing,
wherein the processor is configured to execute a process of the application software in response to the received operation, cause the display to display a second image associated with the executed process, determine whether the operator sits on a driver's seat of a vehicle based on the first images based on a model trained using machine learning with features extracted from the first images, the features including respective components in a vehicle cabin of the vehicle, positions of the respective components, and directions of the respective components, and restrict the process of the application software in a case where the processor determines that the operator sits on the driver's seat based on the first images;

a first sensor configured to detect a movement speed of the information processing device that moves; and a speaker configured to output sound as content of the application software, wherein the process of the application software is executed by acquiring the movement speed of the information processing device from the first sensor and by changing the sound in accordance with the movement speed of the information processing device.

* * * * *